(12) United States Patent
Willis et al.

(10) Patent No.: US 9,702,244 B2
(45) Date of Patent: Jul. 11, 2017

(54) DISTRIBUTED ACOUSTIC SENSING GAUGE LENGTH EFFECT MITIGATION

(71) Applicant: Halliburton Energy Services, Inc., Houston, TX (US)

(72) Inventors: Mark Elliott Willis, Katy, TX (US); Amit Padhi, Houston, TX (US); David Barfoot, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/028,122

(22) PCT Filed: May 1, 2015

(86) PCT No.: PCT/US2015/028773
§ 371 (c)(1),
(2) Date: Apr. 8, 2016

(87) PCT Pub. No.: WO2015/168538
PCT Pub. Date: Nov. 5, 2015

(65) Prior Publication Data
US 2016/0245077 A1    Aug. 25, 2016

Related U.S. Application Data

(60) Provisional application No. 61/988,057, filed on May 2, 2014.

(51) Int. Cl.
*E21B 47/14*    (2006.01)
*G01V 1/40*    (2006.01)
(Continued)

(52) U.S. Cl.
CPC ............ *E21B 47/14* (2013.01); *E21B 47/102* (2013.01); *E21B 47/123* (2013.01); *G01V 1/226* (2013.01); *E21B 49/00* (2013.01)

(58) Field of Classification Search
CPC ...... E21B 47/14; E21B 47/102; E21B 47/123; E21B 49/00; G01V 1/226
See application file for complete search history.

(56) References Cited

U.S. PATENT DOCUMENTS

| 4,042,811 A * | 8/1977 | Brunnett | G06T 11/006 250/369 |
| 6,522,797 B1 * | 2/2003 | Siems | G01H 3/005 250/227.14 |

(Continued)

OTHER PUBLICATIONS

International Search Report and Written Opinion issued in related PCT Application No. PCT/US2015/028773 mailed Aug. 10, 2015, 21 pages.

(Continued)

*Primary Examiner* — Erin File
(74) *Attorney, Agent, or Firm* — Benjamin Fite; Baker Botts L.L.P.

(57) ABSTRACT

A system includes a light source, optical fiber coupled to the light source, one or more interferometers coupled to the optical fiber, wherein each interferometer of the one or more interferometers comprising a gauge length, a photodetector assembly coupled to the optical fiber, and an information handling system. The photodetector assembly is configured to detect backscattered light from the optical fiber and generate signals based on the detected backscattered light. The an information handling system is configured to receive the signals from the photodetector assembly, apply a de-convolution operation to the signals based on the gauge lengths of the one or more interferometers, and store the de-convolved signals.

24 Claims, 10 Drawing Sheets

(51) Int. Cl.
*G01V 1/22* (2006.01)
*E21B 47/10* (2012.01)
*E21B 47/12* (2012.01)
*E21B 49/00* (2006.01)

(56) References Cited

U.S. PATENT DOCUMENTS

| | | | | |
|---|---|---|---|---|
| 2008/0130410 | A1* | 6/2008 | Ferber | G01V 1/364 |
| | | | | 367/38 |
| 2010/0200744 | A1* | 8/2010 | Pearce | G01V 8/16 |
| | | | | 250/268 |
| 2012/0035854 | A1* | 2/2012 | Kragh | G01H 9/004 |
| | | | | 702/17 |
| 2012/0188533 | A1* | 7/2012 | Crickmore | G01H 9/004 |
| | | | | 356/73.1 |
| 2014/0150523 | A1* | 6/2014 | Stokely | E21B 47/123 |
| | | | | 73/1.82 |
| 2016/0252651 | A1* | 9/2016 | Ellmauthaler | G01V 1/40 |
| 2016/0273335 | A1* | 9/2016 | Quintero | G01V 5/101 |

OTHER PUBLICATIONS

International Preliminary Report on Patentability issued in related Application No. PCT/US2015/028773, mailed Nov. 17, 2016 (17 pages).

* cited by examiner

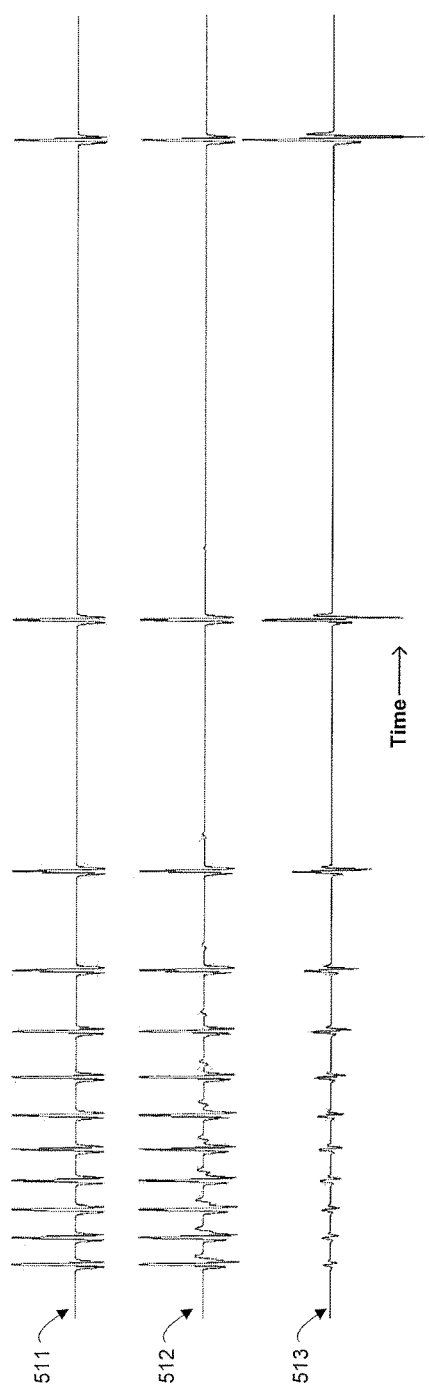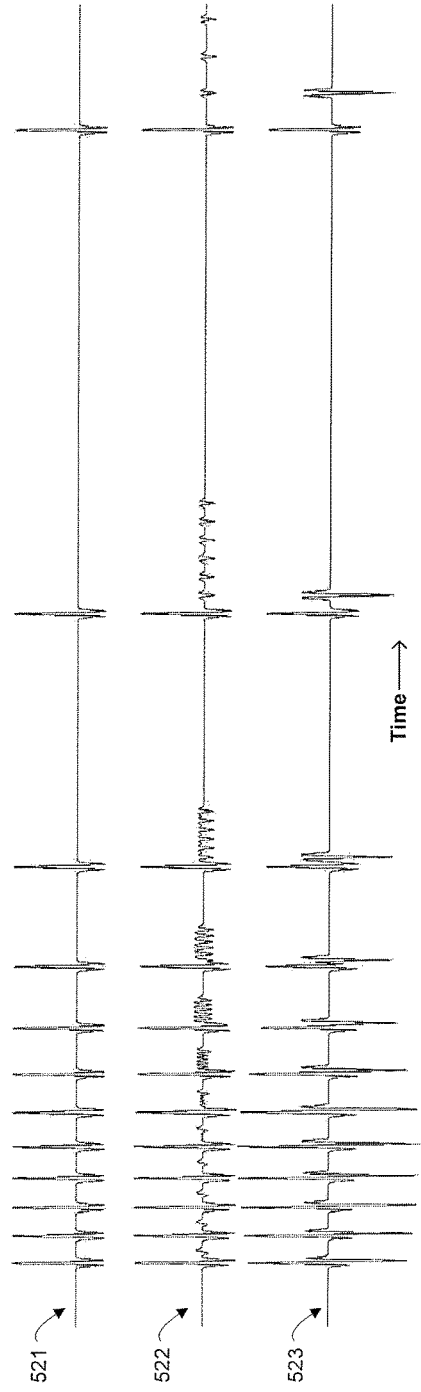

DISTRIBUTED ACOUSTIC SENSING GAUGE LENGTH EFFECT MITIGATION

CROSS-REFERENCE TO RELATED APPLICATIONS

The present application is a U.S. National Stage Application of International Application No. PCT/US2015/028773 filed May 1, 2015, which claims priority to U.S. Provisional Patent Application No. 61/988,057 filed May 2, 2014, both of which are incorporated herein by reference in their entirety for all purposes.

BACKGROUND

This disclosure generally relates to monitoring of hydrocarbon wellbores. In particular, this disclosure relates to systems and methods for monitoring a wellbore using Distributed Acoustic Sensing (DAS).

Acoustic sensing based on DAS may use the Rayleigh backscatter property of a fiber's optical core and may spatially detect disturbances that are distributed along the fiber length. Such systems may rely on detecting phase changes brought about by changes in strain along the fiber's core. Externally-generated acoustic disturbances may create very small strain changes to optical fibers. Data generated by current DAS systems may include artifacts. These artifacts may be caused by the method of measurement used by the DAS systems, such as by measuring disturbances at different distances along the fiber length.

BRIEF DESCRIPTION OF THE DRAWINGS

These drawings illustrate certain aspects of certain embodiments of the present disclosure. They should not be used to limit or define the disclosure.

FIGS. 5A-5D illustrate example DAS data after de-convolution operations, in accordance with embodiments of the present disclosure.

Figure 1:
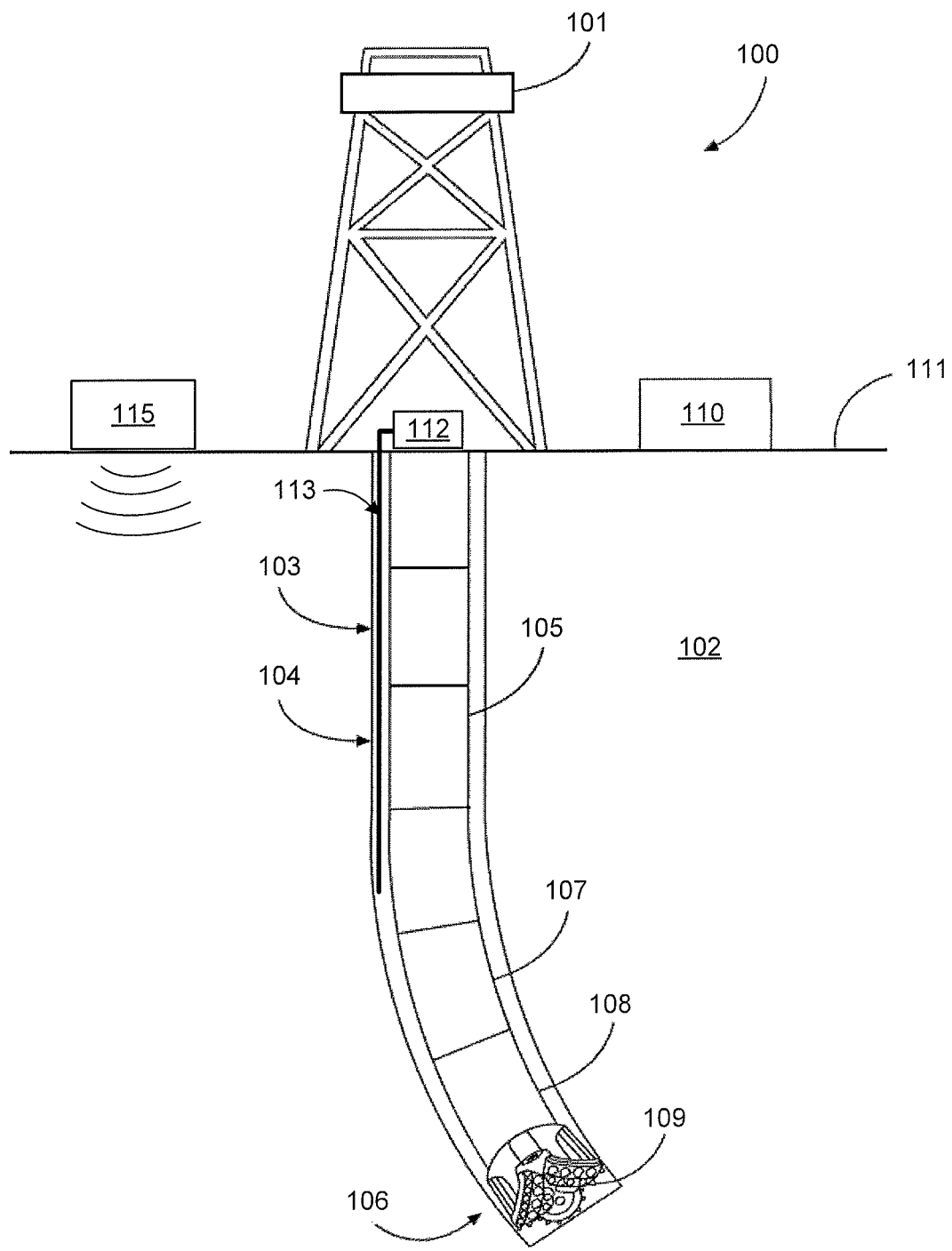
FIG. 1 illustrates an example downhole drilling system, in accordance with embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure describes a method for removing effects of gauge length in distributed acoustic sensing (DAS) data signals. DAS data collection systems rely on detecting phase changes in backscattered light signals to determine changes in strain (e.g., caused by acoustic waves) along the length of optical fiber. To measure the phase changes, measurements of light signals from two different points along the fiber are taken to determine an average amount of strain over that distance. The distance between these two points may be referred to as the gauge length. As described below, the measurements may be taken from the two different locations using hardware (e.g., using interferometers with physical gauge lengths) or software methods (e.g., comparing backscattered signals received at different times).

The distance chosen for the gauge length in DAS data collection systems may have different effects on the data signals collected by the system. For example, longer gauge lengths may produce data signals with better signal to noise ratios. However, longer gauge lengths may have more loss in spectral fidelity than shorter gauge lengths due to the averaging that takes place between two points farther apart from one another than in shorter gauge length embodiments. The gauge length chosen may also cause artifacts in the collected DAS data, as will be shown below. For example, reverberations or ringing may be present in the collected DAS data, and may be especially apparent in slower moving seismic events with longer gauge lengths.

Accordingly, embodiments of the present disclosure may apply one or more operations on collected DAS data signals in order to reduce these effects inherent to DAS data collection systems. For example, one or more de-convolution operations may be applied to the DAS data collected by a DAS system. This may include performing a deconvolution operation on the collected DAS data in the Z-transform or Fourier transform domain. As another example, DAS data associated with different gauge lengths may be combined in order to average out effects uniquely inherent to the particular gauge lengths. For example, DAS data collected using a relatively short gauge length may be weighted and averaged with DAS data collected using a relatively long gauge length.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline, slickline, and logging while drilling/measurement while drilling (LWD/MWD). Certain embodiments may be applicable to subsea and/or deep sea wellbores. Embodiments described below with respect to one implementation are not intended to be limiting.

FIG. 1 illustrates an example downhole drilling system 100, in accordance with embodiments of the present disclosure. The drilling system 100 includes a rig 101 located at a surface 111 and positioned above a wellbore 103 within a subterranean formation 102. In certain embodiments, a drilling assembly 104 may be coupled to the rig 101 using a drill string 105. In other embodiments, the drilling assembly 104 may be coupled to the rig 101 using a wireline or a slickline, for example. The drilling assembly 104 may include a bottom hole assembly (BHA) 106. The BHA 106 may include a drill bit 109, a steering assembly 108, and a LWD/MWD apparatus 107. A control unit 110 located at the surface 111 may include a processor and memory device, and may communicate with elements of the BHA 106 (e.g., logging tools in the LWD/MWD apparatus 107). The control unit 110 may receive data from and send control signals to the BHA 106 or components thereof. Additionally, in some embodiments, at least one processor and memory device may be located downhole within the BHA 106 for the same purposes. The LWD/MWD apparatus 107 may log the formation 102 (i.e., sample, test, and/or otherwise obtain information about the formation) both while the wellbore 103 is being drilled, and after the wellbore is drilled to provide information regarding ongoing subterranean operations.

In particular embodiments, a seismic source 115 may be placed at the surface 111 of downhole drilling system 100, along with a distributed acoustic sensing (DAS) system 112. DAS system 112 may be positioned at the surface 111 of downhole drilling system 100 as illustrated in FIG. 1, or any other suitable location. DAS system 112 may be coupled to an optical fiber 113 that is positioned within a portion of the downhole drilling system 100. For example, optical fiber 113 may be coupled to the inside of wellbore 103 as shown in FIG. 1. Although illustrated as including one DAS system 112 coupled to optical fiber 113, any suitable number of DAS systems 112 (each coupled to optical fiber 113 located downhole) may be placed inside or adjacent to wellbore 103. With optical fiber 113 positioned inside a portion of wellbore 103, DAS system 112 may obtain information associated with formation 102 based on disturbances caused by seismic source 115. For instance, DAS system 112 may be configured to collect seismic data along the length of optical fiber 113 based on determined phase changes in light signals. Example DAS systems 112 and their functionality are described further below with respect to FIGS. 2A-2C.

Modifications, additions, or omissions may be made to FIG. 1 without departing from the scope of the present disclosure. For example, the drill string 105 and BHA 106 may be removed from wellbore 103, with a slickline or wireline logging assembly being lowered into wellbore 103. As another example, multiple seismic sources 115 may be used in conjunction with downhole drilling system 100 and DAS system 112. Moreover, components may be added to or removed from downhole drilling system 100 without departing from the scope of the present disclosure.

Figure 2A:
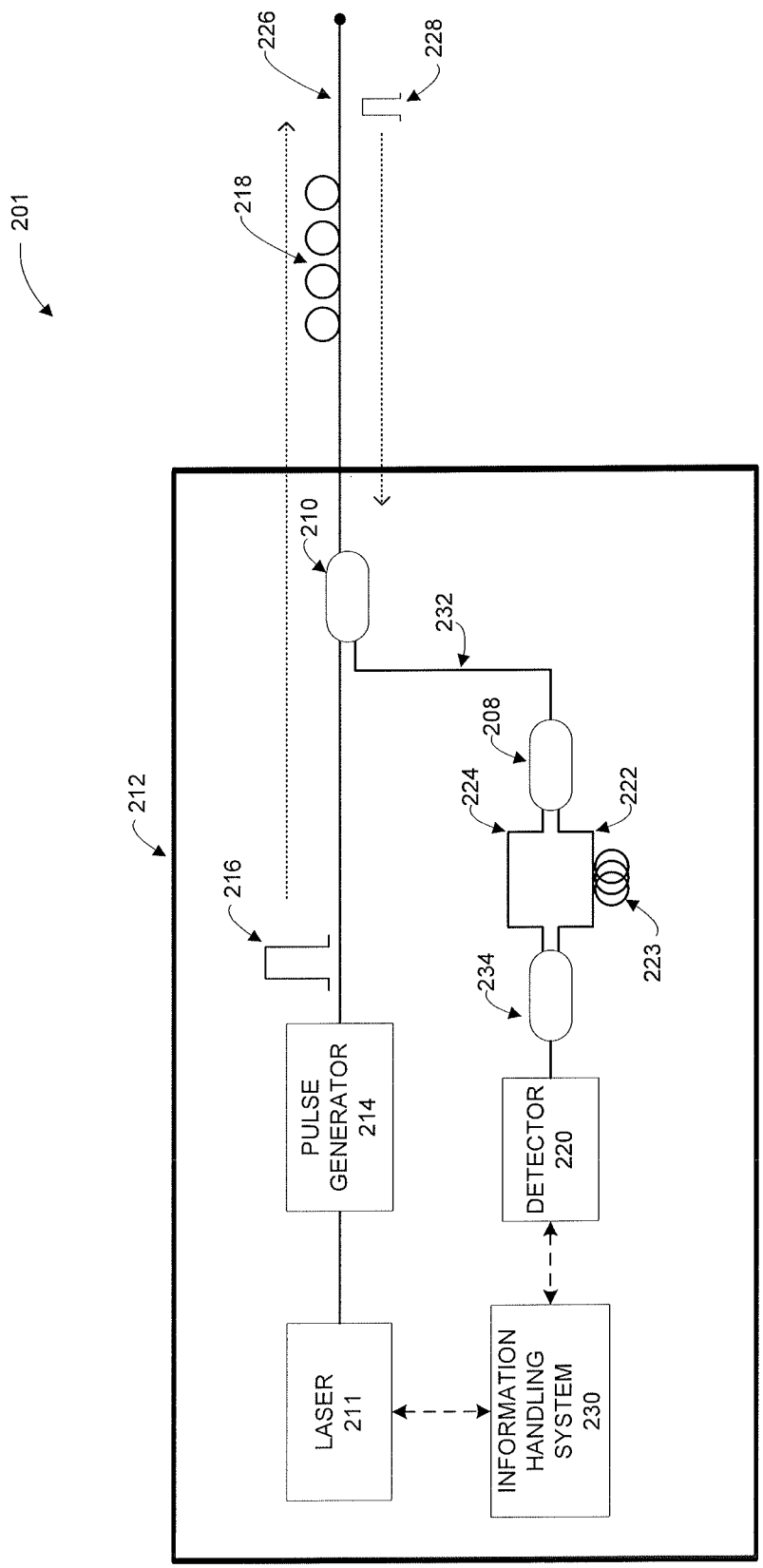
FIGS. 2A-2C illustrate example DAS systems, in accordance with embodiments of the present disclosure.
Figure 2B:
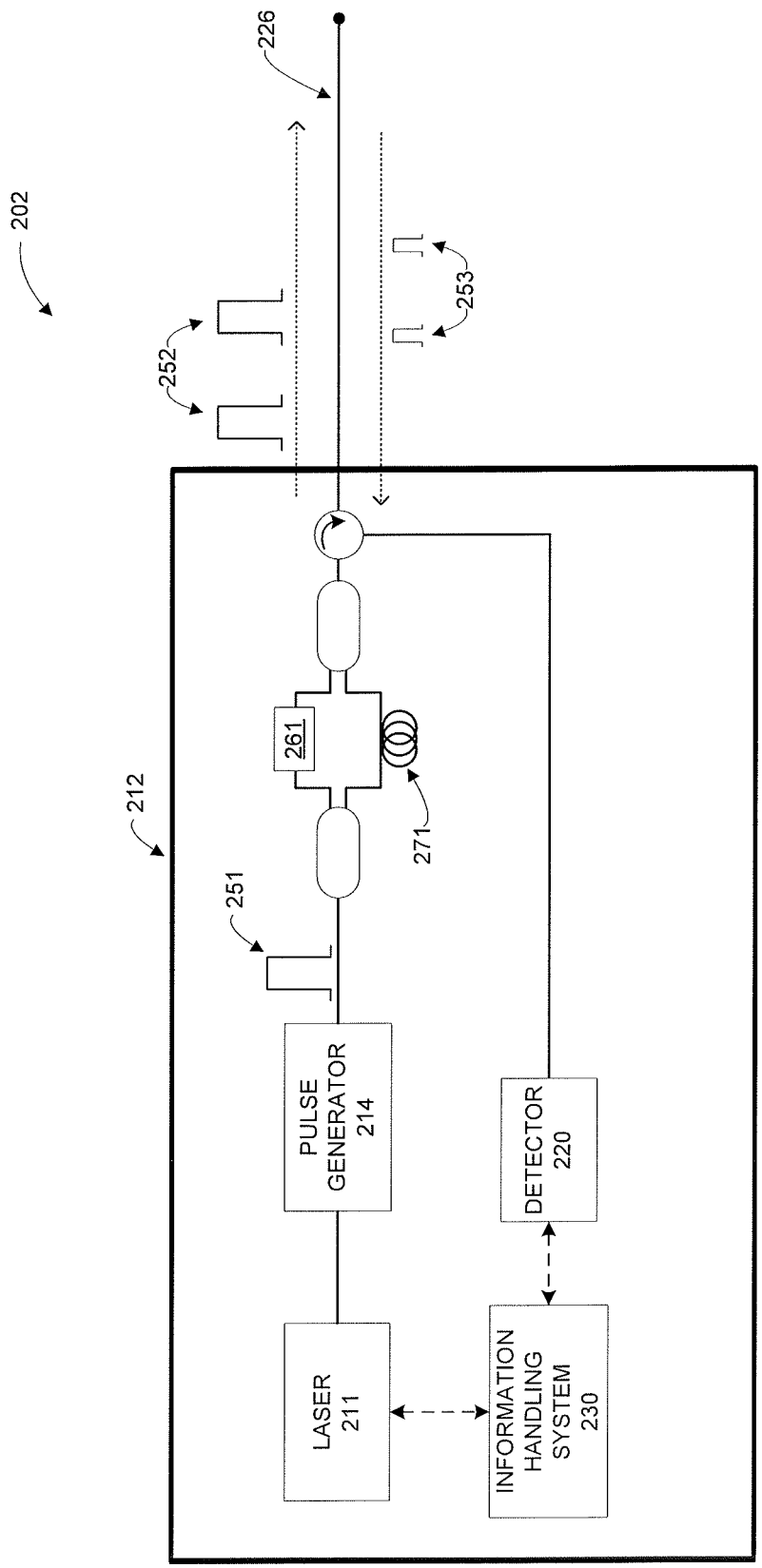
Figure 2C:
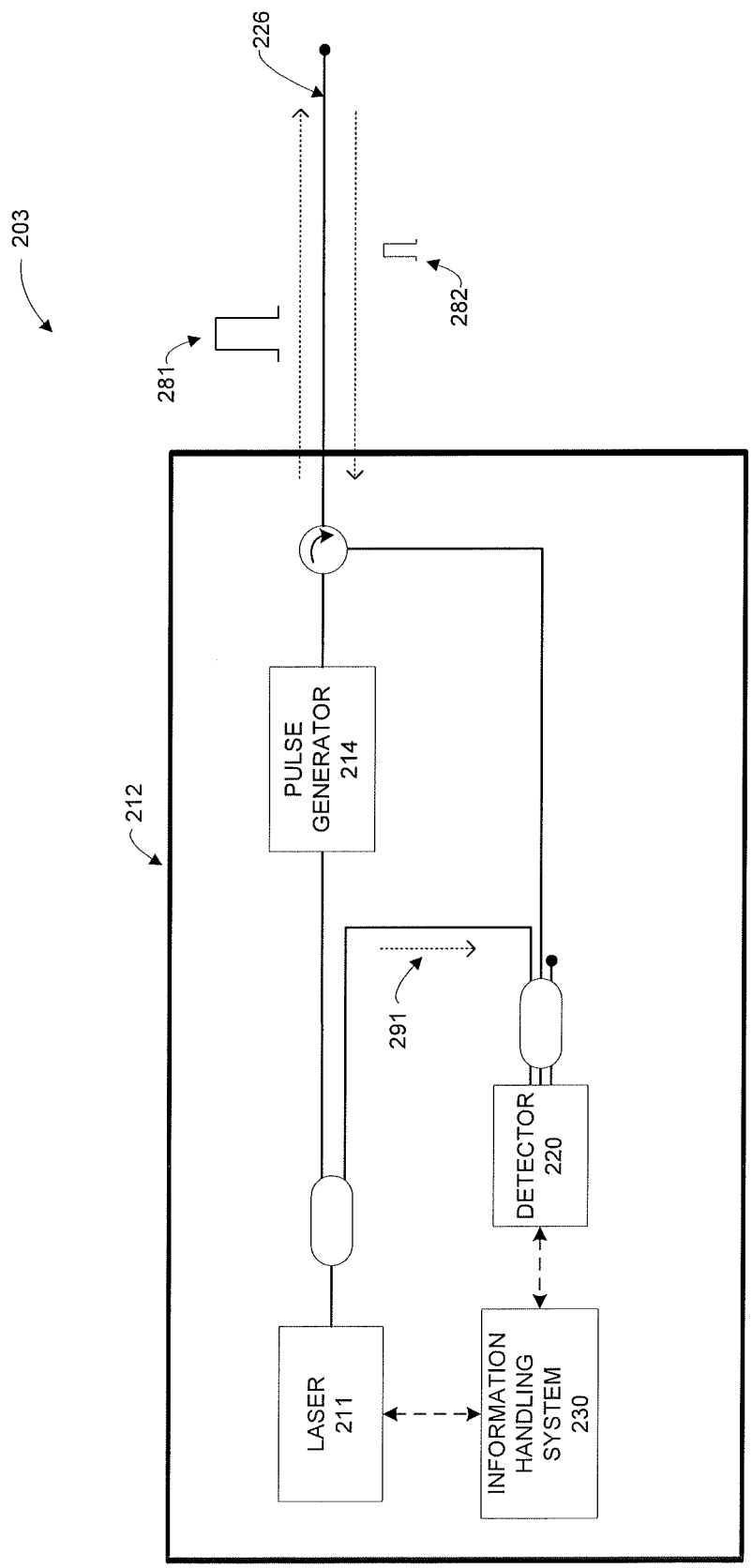

FIGS. 2A-2C illustrate example DAS systems 201-203, in accordance with embodiments of the present disclosure. Any one of DAS systems 201-203 may be incorporated into a downhole drilling system similar to downhole drilling system 100 of FIG. 1, and may be lowered downhole using a drill string, by wireline, slickline, coiled tubing, or by any other means known to those in the art having the benefit of this disclosure. For example, the components in DAS box 212 may be included in DAS system 112 of FIG. 1, and optical fiber 226 may be lowered downhole similar to optical fiber 113 of FIG. 1. DAS systems 201-202 may be single pulse coherent Rayleigh scattering systems with compensating interferometers but are not intended to be limited to such. In particular embodiments, systems 201-203 may be used for phase-based sensing of events in a wellbore (e.g., detecting seismic disturbances along the length of a wellbore) using measurements of coherent Rayleigh backscatter.

Referring to FIG. 2A, a laser 211 and associated pulse generator 214 may be coupled to a first coupler 210 using optical fiber. Laser 211 and pulse generator 214 may be located at any suitable location when performing subterranean operations. For instance, in some embodiments, laser 211 and pulse generator 214 may be located at the surface of the wellbore 103. The pulse generator 214 may include opto-electronics configured to generate interrogating optical pulses 216 using light from laser 211. The first coupler 210 may be a traditional fused type fiber optic splitter, a circulator, a PLC fiber optic splitter, or any other type of splitter known to those with ordinary skill in the art having the benefit of this disclosure. In other embodiments, the first coupler 210 may be a circulator. Optical pulses from the pulse generator 214 may be amplified using optical gain elements, such as any suitable amplification mechanisms including, but not limited to, Erbium Doped Fiber Amplifiers (EDFAs) or Semiconductor Optical Amplifiers (SOAs).

Still referring to FIG. 2A, a second coupler 208 may be coupled to an interferometer. The second coupler 208 may split light from the optical fiber 232 into two paths along interferometer arm 224 and interferometer arm 222. In other words, the second coupler 208 may split the backscattered light (e.g., backscattered light 228) from the optical fiber 232 into a first backscattered pulse and a second backscattered pulse. The first backscattered pulse may be sent into interferometer arm 222. The second backscattered pulse may be sent into interferometer arm 224. The first and second backscattered pulses from interferometer arms 222 and 224 are then re-combined at a third coupler 234 to form an interferometric signal. The first, second, and third couplers 210, 208, and 234 may be a traditional fused type fiber optic splitter, a PLC fiber optic splitter, or any other type of splitter known to those with ordinary skill in the art having the benefit of this disclosure. The interferometer may be used to determine the relative phase shift variations between the light in interferometer arm 224 and interferometer arm 222 as they recombine. Interferometer arm 222 may comprise a gauge 223 in particular embodiments, which may cause the length of interferometer arm 222 to be longer than the length of interferometer arm 224. With different lengths between the two arms of the interferometer, a phase shift of backscattered light from two different points along the wellbore may be measured. The distance between those points may be half the length of the gauge 223 in the case of a Mach-Zehnder configuration, or equal to the gauge length in a Michelson interferometer configuration. The interferometric signal, i.e. the relative phase shift, will vary over the distance of optical fiber 226, and the location of the interferometric signal can be determined using time of flight for the interrogating pulse 216. In DAS system 201 of FIG. 2A, the interferometer is illustrated as a Mach-Zehnder interferometer, but it is not intended to be limited to such. For instance, in certain implementations, a Michelson interferometer or any other type of interferometer known to those of skill in the art having the benefit of this disclosure may also be used without departing from the scope of the present disclosure.

The interferometer may be coupled to a photodetector assembly 220. The photodetector assembly 220 may include associated optics and signal processing electronics, in particular embodiments. The photodetector assembly 220 may be a semiconductor electronic device that uses the photoelectric effect to convert light to electricity. The photodetector assembly 220 may be an avalanche photodiode or a pin photodiode but is not intended to be limited to such. As the light from interferometer arm 224 and interferometer arm 222 reach the third coupler 234, the photodetector assembly 220 may convert the optical signal (i.e., the interferometric signal) to an electronic signal proportional to the acoustic signal along optical fiber 226. The photodetector assembly 220 may be coupled to an information handling system 230. The photodetector assembly 220 and information handling system 230 may be communicatively and/or mechanically coupled. A first device may be communicatively coupled to a second device if it is connected to the second device through a wired or wireless communication network which permits the transmission of information. Thus, the information handling system 230 may be located uphole, downhole, or at a remote location. The information handling system 230 may also be communicatively or mechanically coupled to laser 211 and/or pulse generator 214, in certain embodiments, and may control the operations thereof.

In operation of the system 201, pulse generator 214 may generate an interrogating pulse 216 which is transmitted through first coupler 210 and down optical fiber 226. In certain implementations, pulse generator 214 may include an amplitude modulator or a laser connected to a switching amplifier (i.e. semiconductor optical amplifier (SOA)). In certain embodiments, at least a portion of optical fiber 226 may be arranged in coils 218, as illustrated in FIG. 2A. As the interrogating pulse 216 travels through the optical fiber 226, imperfections in optical fiber 226 may cause a portion of the light to be backscattered along optical fiber 226 due to Rayleigh scattering. Scattered light according to Rayleigh scattering is returned from every point along optical fiber 226 along the length of optical fiber 226 and is shown as backscattered light 228 in FIG. 2A. This backscatter effect may be referred to as Rayleigh backscatter. Density fluctuations in optical fiber 226 may give rise to energy loss due to the scattered light, with the following coefficient:

$$\alpha_{scat} = \frac{8\pi^3}{3\lambda^4} n^8 p^2 k T_f \beta$$

where n is the refraction index, p is the photoelastic coefficient of optical fiber 226, k is the Boltzmann constant, and β is the isothermal compressibility. $T_f$ is a fictive temperature, representing the temperature at which the density fluctuations are "frozen" in the material. Optical fiber 226 may be terminated with a low reflection device (not shown) in certain embodiments. In such implementations, the low reflection device may be a fiber coiled and tightly bent to violate Snell's law of total internal reflection such that all the remaining energy is sent out of the fiber. In other implementations, the low reflection device may be an angle cleaved fiber. In still other implementations, the low reflection device may be a coreless optical fiber with high optical attenuation. In still other implementations, the low reflection device may be a termination, such as an AFL ENDLIGHT.

Backscattered light 228 may travel back through optical fiber 226, until it reaches the second coupler 208. First coupler 210 may be mechanically coupled to second coupler 208 on one side by the optical fiber 232 such that backscattered light 228 may pass from first coupler 210 to second coupler 208 through the optical fiber 232. Second coupler 208 may split backscattered light 228 based on the number of interferometer arms so that one portion of any backscattered light 228 passing through the interferometer travels through interferometer arm 224 and another portion travels through interferometer arm 222. In other words, the second coupler 208 may split the backscattered light from the optical fiber 232 into a first backscattered pulse and a second backscattered pulse. The first backscattered pulse may be sent into interferometer arm 222, and the second backscattered pulse may be sent into interferometer arm 224. These two portions may be re-combined at third coupler 234, and at that point, they may generate an interferometric signal. In the interferometric signal, two signals may be superimposed from points along the wellbore separated by a distance of L, where L is the difference in length between interferometer arm 224 and interferometer arm 222 (i.e., the gauge length). The output from the interferometer, or the interferometric signal, includes back scattered interfered light from two positions. This interferometric signal may reach the photodetector assembly 220, where it may be converted to an electrical signal. The photodetector assembly may provide an electric signal proportional to the square of the sum of the two electric fields from the two arms of the interferometer. This signal is proportional to P(t)=$P_1$+$P_2$+2*Sqrt($P_1P_2$)cos($\phi_1$-$\phi_2$) where $P_n$ is the power incident to the photodetector from a particular arm (1 or 2) and $\phi_n$ is the phase of the light from the particular arm of the interferometer. The photodetector assembly 220 may provide output relating to the back scattered light 228 to the information handling system 230, which may convey the data to a display and/or store it in computer-readable media. In certain embodiments, information handling system 230 may perform one or more operations on the data from the photodetector assembly 220, such as one or more de-convolution operations as described further below.

In certain embodiments, such as DAS system 201 of FIG. 2B, a compensating interferometer may be placed in the launch path (i.e. prior to traveling down optical fiber 226) of the interrogating pulse 251 to generate a pair of pulses 252 that travel down optical fiber 226. In such embodiments, an additional interferometer may not be necessary to interfere the backscattered light 253 from pulses 252 prior to being sent to photo detector assembly 220. The compensation interferometer in the launch path of interrogating pulse 251 may be similar to the interferometer of FIG. 2A, with one arm of the interferometer comprising an extra length of fiber not present in the other arm (i.e., a gauge length similar to gauge 223 of FIG. 2A). In certain embodiments, to accommodate phase detection of backscattered light using system 202, one of the two arms of the interferometer may include an optical frequency shifter 261 (for example, an acousto-optic modulator) to shift the optical frequency of one of the pulses, while the other may include a gauge 271, as illustrated in FIG. 2A. This may allow using a single photodetector receiving the backscatter light to determine the relative phase of the backscatter light between two locations by examining the heterodyne beat signal received from the mixing of the light from different optical frequencies of the two interrogation pulses.

Although illustrated in FIGS. 2A-2B as comprising two arms (e.g., interferometer arm 224 and interferometer arm 222 of FIG. 2A), systems 201-202 may generate interferometric signals for analysis or processing by information handling system 230 without the use of a physical interferometer. For example, as illustrated in FIG. 2C, DAS system 203 may direct backscattered light to photo detector assembly 220 without first passing it through any interferometer. Referring to FIG. 2C, the backscattered light 282 from interrogation pulse 281 may be mixed with the light 291 from laser 211. In other words, the light from laser 211, the interrogation pulse 281, and the backscattered signal 282 may all be collected by photodetector 220 and then analyzed by information handling system 230. The light from each of these sources may be at the same optical frequency in a homodyne phase demodulation system, or may be different optical frequencies in a heterodyne phase demodulator. This method of mixing the backscattered light with a local oscillator allows measuring the phase of the backscattered light along the fiber relative to a reference light source. Using this method, the gauge length can be applied by information handling system 230 after data has been recorded by subtracting the measured phase from any two locations along the fiber and tracking this phase difference between the two locations over time to obtain an acoustic signal recorded by the fiber between the two selected locations. In other words, the information handling system 230 may generate an interferometer in system 203 using software embedded therein. Accordingly, instructions embodied in computer-readable medium of information handling system 230 may be used to compare data from two backscattered light signals received at different times, essentially replicating the function of the interferometers in systems 201-202 of FIGS. 2A-2B.

Modifications, additions, or omissions may be made to FIGS. 2A-2C without departing from the scope of the present disclosure. For instance, interferometers of a DAS system in accordance with embodiments of the present disclosure may have more than two arms. As an example, the interferometer of DAS system 201 may have a third arm in addition to arms 222 and 224 with an additional gauge length. Accordingly, signals associated with multiple gauge lengths may be collected, analyzed, or processed by the DAS system. In addition, in particular embodiments, a continuously modulated interrogation signal may be emitted into optical fiber 226 instead of pulses. As an example, a phase, frequency, or amplitude modulator may be placed after laser 211 instead of pulse generator 214 to send a coded or spread-spectrum interrogation signals down optical fiber 226 to allow DAS data collection, analysis, and/or processing using information handling system 230. Furthermore, components illustrated in one of systems 201-203 may be used in the other illustrated embodiments. For example, coils 218 of FIG. 2A may be implemented in DAS systems 202-203. As another example, an interferometer used to interfere backscattered light signals (e.g., the interferometer illustrated in FIG. 2A) may also be incorporated into DAS system 202 of FIG. 2B. Moreover, components may be added to or removed from DAS systems 201-203 without departing from the scope of the present disclosure.

Figure 3A:
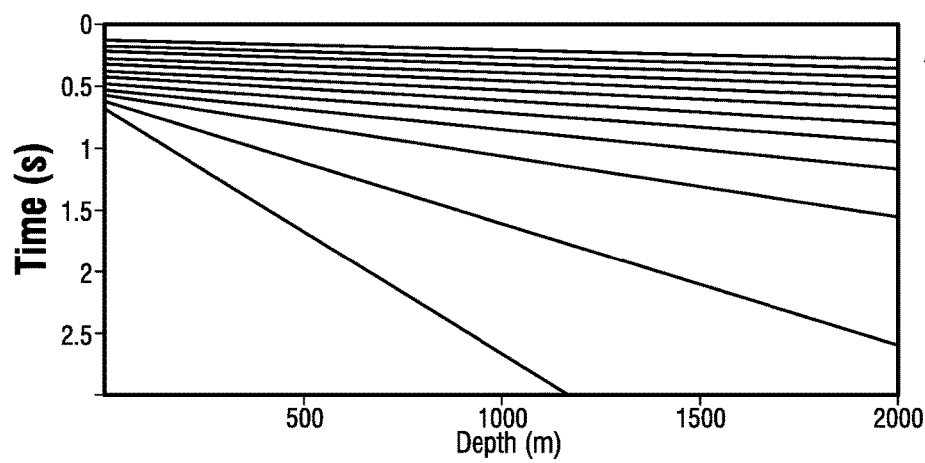
FIGS. 3A-3D illustrate example effects of gauge length on seismic data collected by DAS systems, in accordance with embodiments of the present disclosure.
Figure 3B:
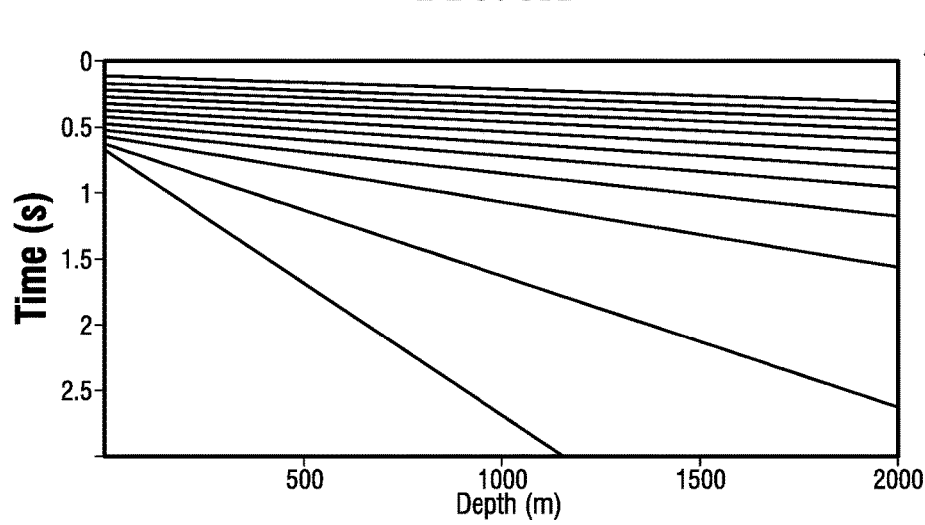
Figure 3C:
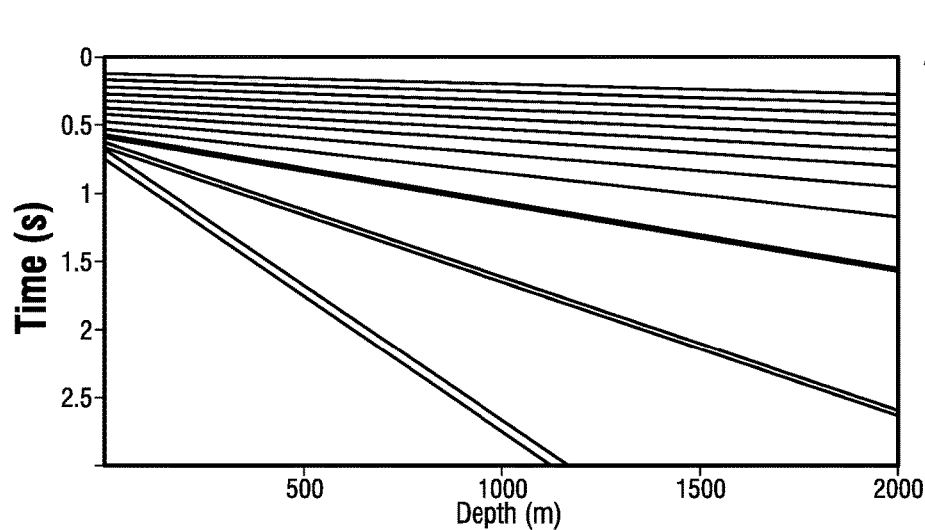
Figure 3D:
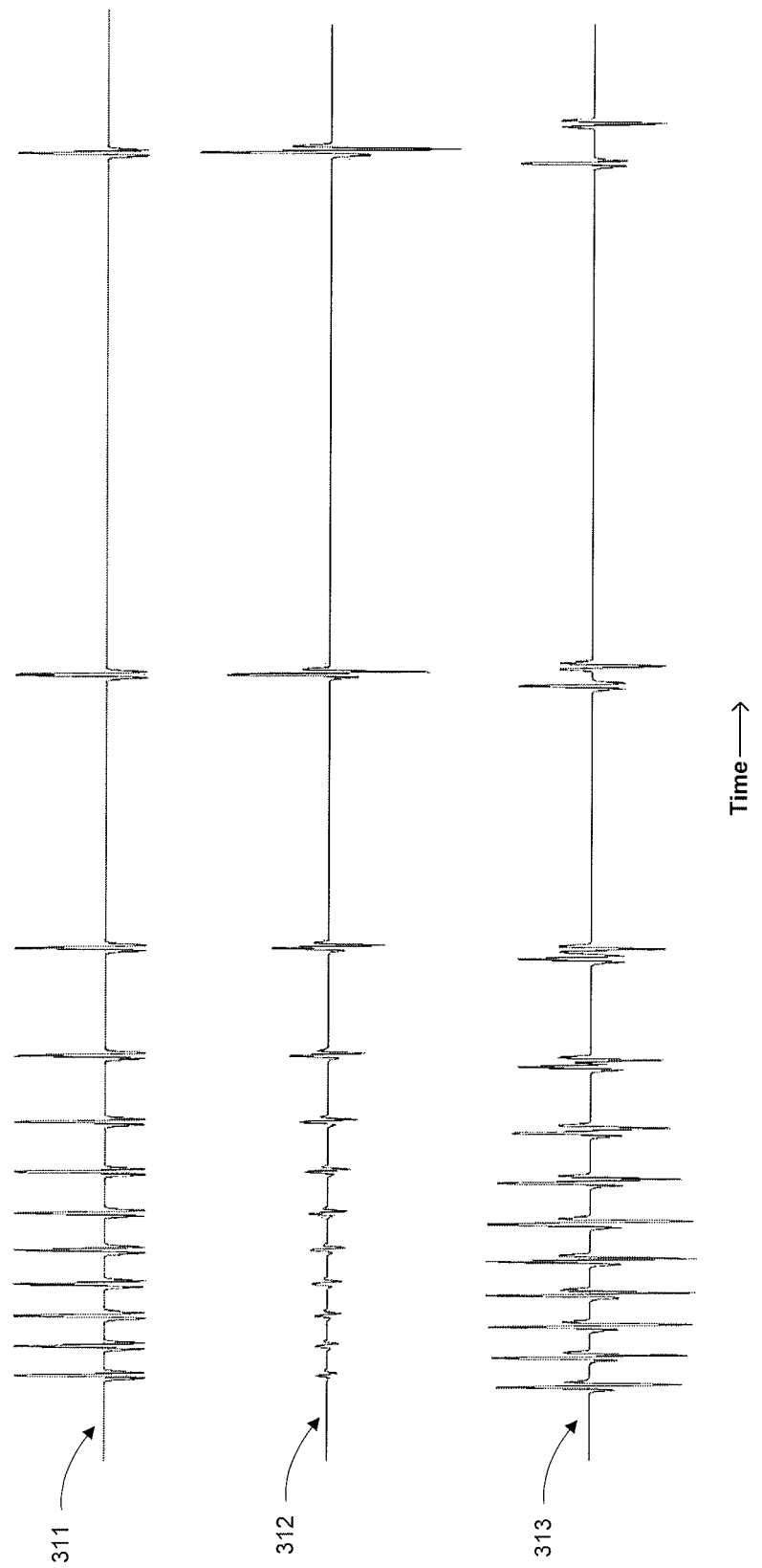

FIGS. 3A-3D illustrate example effects of gauge length on seismic data collected by DAS systems, in accordance with embodiments of the present disclosure. In particular, FIG. 3A illustrates example seismic information 301 that may be incident upon a DAS system, such as DAS systems 201-203 of FIGS. 2A-2C. Seismic information 301 may be indicative of seismic data that would be recorded by geophones or accelerometers in the borehole, for instance. Seismic information 301 comprises 12 linear events traveling at different apparent velocities along a borehole. FIGS. 3B-3C illustrate example DAS data sets 302 and 303 that may be collected by a DAS system (e.g., DAS systems 201-203 of FIGS. 2A-2C) comprising different gauge lengths. More particularly, FIG. 3B illustrates DAS data 302 collected using a relatively short gauge length (e.g., 3 meters), while FIG. 3C illustrates DAS data 303 collected using a relatively long gauge length (e.g., 40 meters). FIG. 3D illustrates traces 311-313 of seismic information 301 and DAS data 302-303, respectively.

Two effects will be recognized in DAS data 302-303 of FIGS. 3B-3C and traces 312-313 of FIG. 3D. First, there are amplitude effects caused by the different gauge lengths. For example, in DAS data 302, it will be recognized that the fast events (i.e., those with faster apparent velocities, near the top of the panel) show reductions in amplitudes when compared with seismic information 301. That is, these nearly flat events have been greatly attenuated. However, in DAS data 303, it will be recognized that the fast events have been amplified relative to seismic information 301. These effects may also be recognized when comparing traces 311-313 of FIG. 3D as well. Second, there are effects upon the wavelet shape as shown in traces 311-313 of FIG. 3D). In trace 312, for example, it will be recognized that the resulting wavelet has been changed from a simple Ricker wavelet to a more complicated wavelet. As another example, in trace 313, it will be recognized that the wavelet has been pulled apart into two wavelets (which may also be recognized on the slower, steeply dipping events near the bottom of the panel of FIG. 3C).

Figure 4A:
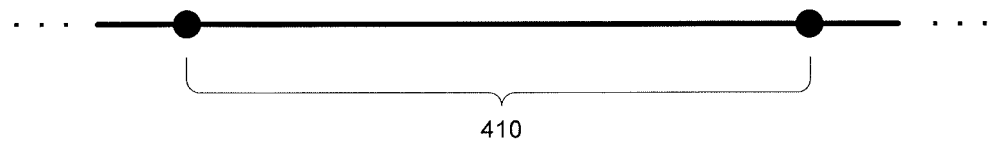
FIGS. 4A-4C illustrate an example model of gauge length effects in a DAS system, in accordance with embodiment of the present disclosure.
Figure 4B:
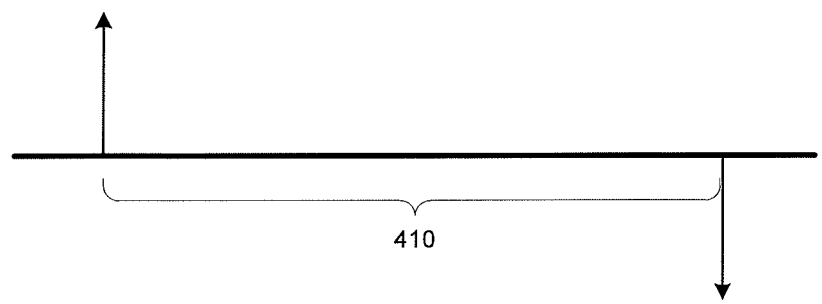
Figure 4C:
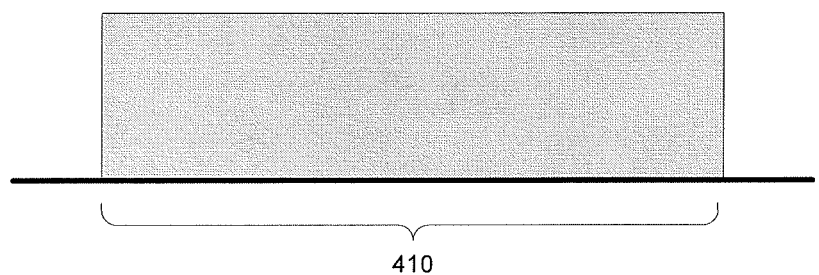

FIGS. 4A-4C illustrate example models of gauge length effects in a DAS system, in accordance with embodiments of the present disclosure. In particular, FIG. 4A illustrates a portion of an optical fiber of a DAS system (e.g., optical fiber 226 in DAS systems 201-203 of FIGS. 2A-2C). The two dots indicate the gauge length 310 of the gauge used in the interferometer of the DAS system (e.g., gauge 223 FIG. 2A or the gauge chosen by software in FIG. 2C). While the gauge itself may not be located in the measurement portion of the optical fiber (as described above), the way in which acoustic or seismic energy in the wellbore may be detected is greatly affected by this gauge length 310. In DAS systems, such as DAS systems 201-203 of FIGS. 2A-2C, the vibrations at the left dot of FIG. 4A are compared to the vibrations at the right dot of FIG. 4A. A phase difference between the positions of the two dots may be determined and used as a measurement of the strain or stretching of the optical fiber associated with acoustic or seismic energy incident upon the fiber. One method of determining the strain of the optical fiber over the gauge length includes a subtraction model, wherein the determined strain in the optical fiber is based on a difference in strain between the two ends of the gauge length, as is discussed below with respect to FIG. 4B. Another method of determining the strain of the optical fiber over the gauge length includes a summation model, wherein the determined strain in the optical fiber is based on a sum of the strain occurring between the two ends of the gauge length, as is discussed below with respect to FIG. 4C.

FIG. 4B illustrates a delta function or spike representation model of the effect of the gauge length 310 on the measurement of the acoustic or seismic signal incident upon the DAS system, according to the subtraction method described above (i.e., determining a difference in strain between the two ends of the gauge length). In other words, the measurement may be modeled as imparting a spatial convolution on the detected wavefield incident upon the optical fiber using the model represented in FIG. 4B as a 1 followed by a −1 at a distance equal to the gauge length 310. This may be mathematically shown, for example, by a Z-transform of $1-Z^{\hat{}}(g)$, where g is the gauge length (and ˆ indicates that g is the exponent of Z). Thus, the spatial dimension of all signals measured by a DAS system may have been convolved with $(1-Z^{\hat{}}(g))$. If g were infinitesimally small, this would impart a spatial derivative.

Acoustic or seismic energy may be recorded at many points along the optical fiber (e.g., at various depths in a wellbore, sometimes referred to as channels). The notation P(z,t) may be used to denote a recorded trace at location z (e.g., a particular distance along the cable, or a particular channel), and time of sampling t. The Z-transform of P(z,t) is thus given by P(Z,t), and the effect of the DAS gauge length in the subtraction model may then be represented by:

$$P(Z,t)=M(Z,t)*(1-Z^g) \qquad \text{Equation 1}$$

where M(z,t) is the signal associated with the acoustic or seismic energy at each point along the cable, and M(Z,t) is its Z-transform. It will be recognized that convolution in the Z-domain is equivalent to multiplication in the Z-transform domain.

Accordingly, it will be seen that artifacts in data sensed by DAS systems may be modeled by convolution of the signal incident to the sensors with delta functions at z=0 and z=g, where g is the gauge length in the DAS system (e.g., the difference in length between interferometer arms). In order to remove the artifacts inherent to the DAS system, a de-convolution function may be used. One such way to implement the de-convolution function may to use the inverse of the Z-transform. This is simply the inverse of this operator which is the infinite geometry series represented below by Equation 2:

$$(1-Z^g)^{-1}=1+Z^g+Z^{2g}+Z^{3g}+\ldots \quad \text{(Equation 2)}$$

Since there are only a limited number of depth levels (i.e., channels) in a DAS data set, the series above may be truncated to a reasonable operator length. Since g is the gauge length, the operator length L corresponds to a physical length of the de-convolution operator in the well, which is given by (n−1)*g, where n is the number of terms in the series which is used. So, for example, if the well is 2000 meters in depth and the gauge length is 40, a small number of terms, like n=5, need to be used since this corresponds to an operator length of L=(5−1)*40=160 meters. A longer number of terms in the sequence, such as n=101, would result in an operator length of L=(101−1)*40=4000, which may be longer than the well is deep. Therefore, it may not be possible to apply this long of an operator. However, for a short gauge length, like g=3, n=101 terms gives an operator length of only 300 meters.

Any number of approximations to Equation 2 can be used. For example, one approach to reduce artifacts, which are caused by truncating the number of terms used in the series, can be to weight the terms with a function w(i) (where i represents the sequential term of the sequence), such as shown below in Equation 3:

$$(1-Z^g)^{-1} \approx w(1)*1+w(2)*Z^g+\ldots+w(n)*Z^{(n-1)g} \quad \text{(Equation 3)}$$

Any number of different sets of weights could be used to minimize the truncation effects. In addition, any suitable weighting function can be used, such as a linear taper function or an exponential taper function. One example uses weights with a linearly decreasing amplitude ramp, w(i)= (n−i)/n, resulting in Equation 4 below:

$$(1-Z^g)^{-1} \approx 1 + \frac{(n-1)}{n}*Z^g + \ldots + \frac{1}{n}*Z^{(n-1)g} \quad \text{(Equation 4)}$$

Although discussed above as using an inverse Z-transform to de-convolve DAS data from DAS systems, it will be understood that any suitable mathematical transform may be used to de-convolve the measured data from the DAS system instead of the inverse Z-transform. For example, a discrete Fourier transform may be used. Since the effect of the DAS measurement may be represented by spike or delta functions at z=0 and z=g (as shown above), where g is the gauge length, the equivalent of Equation 1 using Fourier transform analysis would be Equation 5 as shown below:

$$P(z,t)=M(z,t)-M(z+g,t)=M(z,t)\odot((\delta(0)-\delta(g)) \quad \text{(Equation 5)}$$

where $\odot$ denotes convolution, and $\delta(r)$ is a unit delta function at distance r. The discrete Fourier transform of Equation 5 therefore gives Equation 6 shown below:

$$P(k,t)=M(k,t)*(1-e^{j2\pi kg/N}) \quad \text{(Equation 6)}$$

where j is the square root of −1, k is the spatial wavenumber index, and N is the number of points in the discrete transform. The inverse of the gauge length operator can thus be found (as in Equation 2) as:

$$(1-e^{j2\pi kg/N})^{-1}=1+Q^g+Q^{2g}+Q^{3g}+\ldots \quad \text{(Equation 7)}$$

where Q=e^(j*k/N). As with the Z-transform embodiment, we can truncate this series and apply weights to each term such as:

$$(1-e^{j2\pi kg/N})^{-1}=w(1)+w(2)*Q^g+w(3)*Q^{2g}+\ldots \quad \text{(Equation 8)}$$

Thus, Equation 8 can be applied as the de-convolution operator to the DAS data which have been transformed into the (k,t) space, following a discrete Fourier transform over the z-axis. Any suitable weighting function can be used, just as before with the Z-transform, such as a linear taper function or an exponential taper function.

FIG. 4C illustrates a delta function or spike representation model of the effect of the gauge length 310 on the measurement of the acoustic or seismic signal incident upon the DAS system, according to the summation method described above (i.e., determining a sum of the strain occurring between the two ends of the gauge length). In other words, the measurement may be modeled as imparting a spatial convolution on the detected wavefield incident upon the optical fiber using the model represented in FIG. 4C as a "boxcar" (i.e., rectangular) convolution function over the gauge length 310. This may be mathematically shown, for example, by a Z-transform of $\Sigma(Z^{\wedge}(n))$ from n=0 to n=g, where g is the gauge length (and ^ indicates that g is the exponent of Z). If g were infinitesimally small, this would impart a spatial integral.

Acoustic or seismic energy may be recorded at many points along the optical fiber (e.g., at various depths in a wellbore, sometimes referred to as channels). Thus, in certain embodiments, the boxcar function of FIG. 4C may be modeled as delta functions occurring at each measurement point (i.e., channel) along the optical fiber. As before, the notation P(z,t) may be used to denote a recorded trace at location z (e.g., a particular distance along the cable, or a particular channel), and time of sampling t. The Z-transform of P(z,t) is thus given by P(Z,t), and the effect of the DAS gauge length in the summation model may then be represented by:

$$P(Z, t) = M(Z, t) * \left( \sum_{i=0}^{i=g} Z^i \right) \quad \text{Equation 9}$$

where M(z,t) is the signal associated with the acoustic or seismic energy at each point along the cable, and M(Z,t) is its Z-transform. Accordingly, to remove the artifacts inherent to the DAS system, a de-convolution function using the inverse of Equation 9 may be used, in particular embodiments. For example, the inverse of Equation 9 may be derived using long division of the expression shown below in Equation 10:

$$\left( \sum_{i=0}^{i=g} Z^i \right)^{-1} = \frac{1}{(1+Z+\ldots+Z^g)} \quad \text{(Equation 10)}$$

Equation 10 may be further approximated by truncating the resulting series to a reasonable number of terms, as discussed above. For example, if the gauge length is 3 meters, then the resulting inverse operator for Equation 10 using the first 6 terms becomes:

$$\left(\sum_{i=0}^{i=3} Z^i\right)^{-1} \approx 1 - Z + Z^4 - Z^5 + Z^8 - Z^9 \quad \text{(Equation 11)}$$

In addition, in certain embodiments, weights may be applied to each of the terms of Equations 10 and 11 as described above with respect to Equations 3 and 8. The weights may be chosen using any suitable weighting function, such as a linear or exponential weighting function.

Although described above using the inverse Z-transform as the deconvolution operation, it will be recognized that any suitable transform may be used in de-convolving the collected DAS data using the summation model, such as the inverse Fourier transform. In embodiments where the Fourier transform is used, the discrete Fourier transform of the boxcar of length g is given by:

$$h(k) = \frac{1 - e^{-j2\pi kg/N}}{g*(1 - e^{-j2\pi k/N})} \quad \text{(Equation 12)}$$

where k is the spatial wavenumber index of the spatial Fourier transform. The de-convolution can then be accomplished by spectral division of the discrete spatial Fourier transform of the measured DAS signal, M(k,t).

Figure 5A:
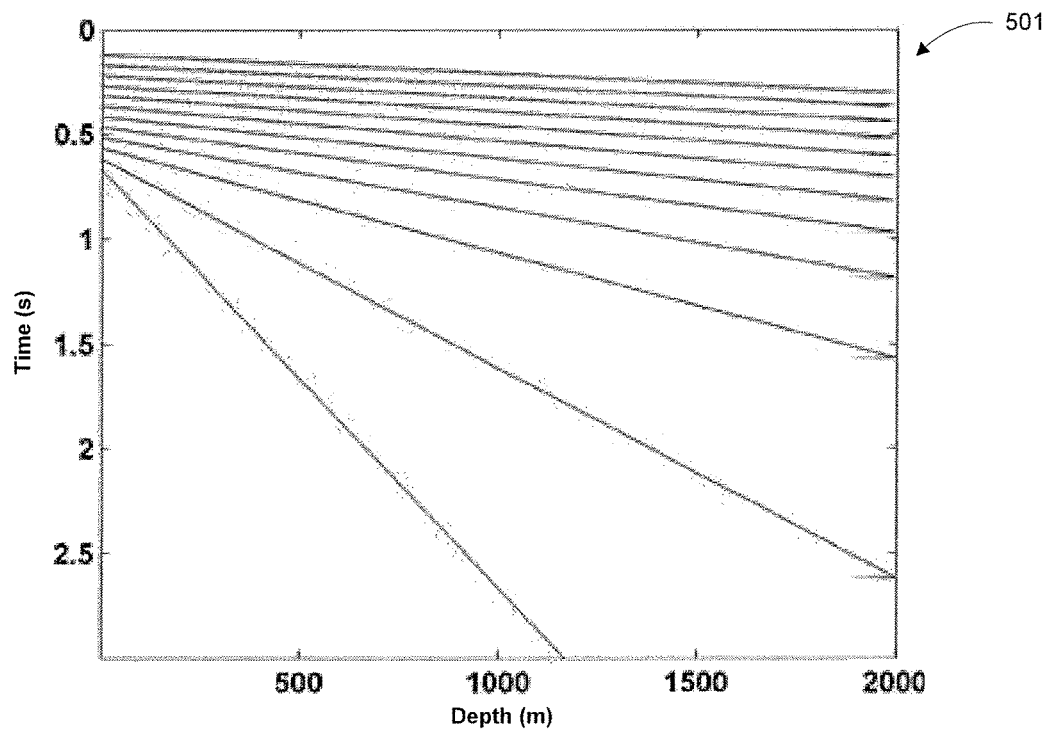
Figure 5B:
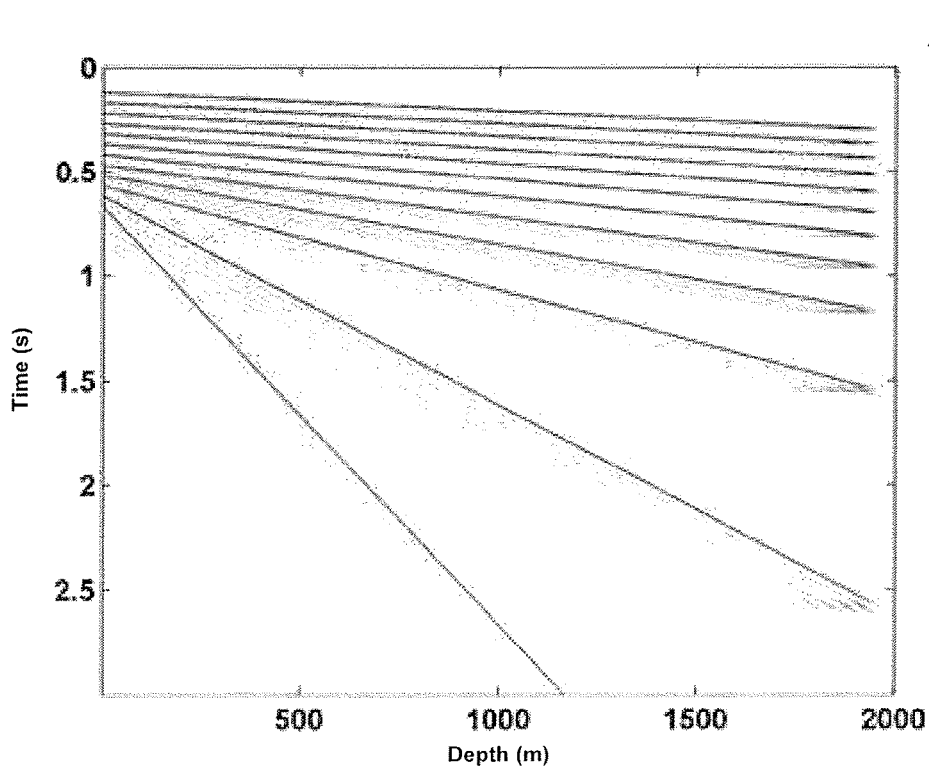

FIGS. 5A-5D illustrate example DAS data after de-convolution operations, in accordance with embodiments of the present disclosure. In particular, DAS data 501-502 of FIGS. 5A-5B illustrate the effect of applying the de-convolution operation represented by Equation 4 above to the DAS data 302-303 of FIGS. 3B-3C, respectively. FIG. 5C illustrates example traces 511-513 associated with seismic information 301 of FIG. 3A, DAS data 501 of FIG. 5A, and DAS data 302 of FIG. 3B, respectively. Likewise, FIG. 5D illustrates example traces 521-523 associated with seismic information 301 of FIG. 3A, DAS data 502 of FIG. 5B, and DAS data 303 of FIG. 3C, respectively. Comparing FIGS. 3B-3D and 5A-5D, it will be recognized that the de-convolution operation has restored the amplitudes of the measured data to a level more approximate to the seismic information 301 of FIG. 3A that is incident upon the DAS system. Referring to FIGS. 5C-5D, it will be recognized that the de-convolved data of traces 512 and 522, respectively, is nearly reshaped back to the Ricker wavelet incident upon the DAS system (i.e., the data shown in traces 511 and 521). Accordingly, it will be recognized that the data after the de-convolution operation is more similar to the Ricker wavelet shape and has amplitudes more similar to the Ricker wavelets incident upon the DAS systems.

However, it will be recognized that small reverberations may be present after the main wavelet, for some gauge lengths. Such reverberations may be seen in traces 512 522 of FIGS. 5C-5D, which may represent the effect of the truncation of the series in Equations 2-4. Additional reverberations may be seen in DAS data 501 and 502 of FIGS. 5A-5B around the 2000 meter depth, which may be due to the lack of data at deeper depths than what was recorded in a wellbore (i.e., caused by an edge effect of a limited number of traces in the data set). To reduce such an edge effect, in particular embodiments, a set of weights may be applied to the DAS traces before the de-convolution operation is applied. These weights may serve to minimize the effect of not having traces below the last measurement in the well. To apply the de-convolution operation, we need a spatial sample interval for the traces, for example 1 meter, which is easily divided into the gauge length. The de-convolution operator has the form of the inverse of (1−Z^g) in Equation 2, which can be approximated by either Equation 3 or 4 as discussed above.

Using the above disclosure, the gauge length used by DAS systems incorporating de-convolution operations may be determined. For example, based on the equations above, a gauge length which is an integer multiple of the spatial distance between the recorded DAS traces may be selected. Moreover, the selected gauge length may be a small number, preferably between 2 and 5 times the spatial distance between the recorded DAS traces.

Figure 6:
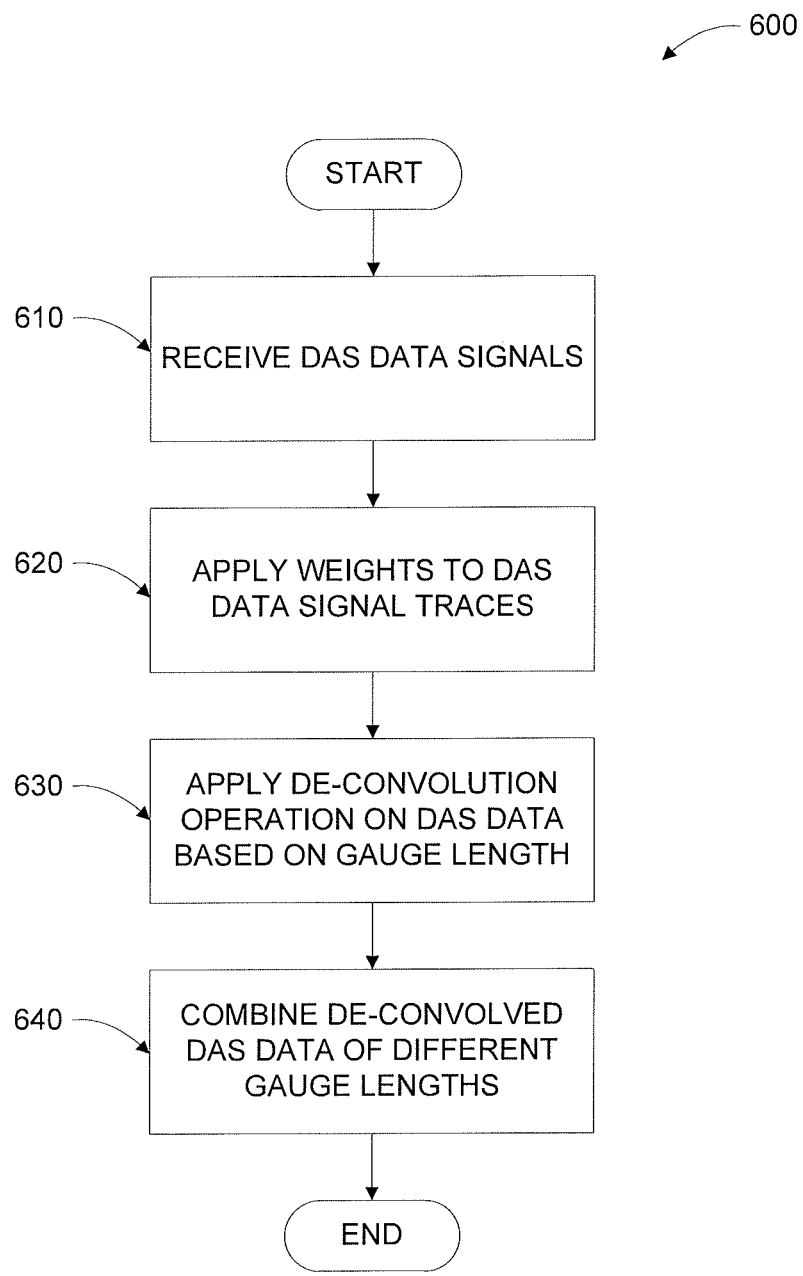
FIG. 6 illustrates an example method for removing artifacts in DAS data, in accordance with embodiments of the present disclosure.

FIG. 6 illustrates an example method 600 for removing artifacts in DAS data, in accordance with embodiments of the present disclosure. The artifacts may be inherent to the DAS data collection method, as described above. Method 600 begins at step 610, where DAS data signals are received from a DAS data system. The DAS data signals may be received from a DAS data system similar to those discussed above with respect to FIGS. 2A-2C, and the DAS data signals may be similar to the example DAS data sets discussed above with respect to FIGS. 3B-3D. For example, the DAS data signals may be received at an information handling system of a DAS system.

At step 620, weights may be applied to the received DAS data signals. In particular embodiments, weights may be applied to the DAS traces based upon the distance of each trace from the bottom (and/or top) of the well. Any suitable weighting of terms may be used, which may be based on the goal of weighing. For example, as discussed above, it may be desired to weigh down data on the edge of the DAS data set in order to reduce reverberations in the de-convolved data set.

At step 630, the weighted DAS data may be de-convolved using a de-convolution operation. In particular embodiments, this may include applying an inverse Z-transform, or the inverse of the equation (1−Z^g), as described above. For instance, Equation 1 above may be used as the de-convolution operation. As another example, the de-convolution operation may be performed using a finite number of terms, such as those illustrated above in Equation 2. As yet another example, a weighted version of Equation 2, such as Equation 3 above, may be used in the de-convolution operation. The weights w(i) of Equation 3 can be any suitable tapering values, such as linearly tapering values or exponentially tapering values. That is, the weights applied to the terms may decrease for each extra term in the sequence. Alternatively, in other embodiments, an inverse Fourier transform operations may be used in place of the inverse Z-transform operations, as discussed above.

At step 640, DAS data associated with different gauge lengths may be combined. This may be done to reduce artifacts uniquely inherent to each of the respective gauge lengths. For example, the data associated with a relatively short gauge length (e.g., 5 meters) and a relatively long gauge length (e.g., 40 meters) may be averaged together. In some embodiments, weights may be applied in order to bias the combination toward a particular gauge length. For instance, more weight may be applied to the shorter gauge length data as compared to the longer gauge length data. This may be useful in embodiments where signal to noise ratios are not as important as spectral fidelity or resolution.

However, some embodiments may apply more weight to the data associated with the longer gauge length in order to enhance signal to noise ratios.

Modifications, additions, or omissions may be made to method 600 without departing from the scope of the present disclosure. For example, the order of the steps may be performed in a different manner than that described and some steps may be performed at the same time. Additionally, each individual step may include additional steps without departing from the scope of the present disclosure.

To provide illustrations of one or more embodiments of the present disclosure, the following examples are provided.

In one embodiment, a system comprises a light source, optical fiber coupled to the light source, one or more interferometers coupled to the optical fiber, wherein each interferometer of the one or more interferometers comprising a gauge length, a photodetector assembly coupled to the optical fiber, and an information handling system. The photodetector assembly is configured to detect backscattered light from the optical fiber and generate signals based on the detected backscattered light. The an information handling system is configured to receive the signals from the photodetector assembly, apply a de-convolution operation to the signals based on the gauge lengths of the one or more interferometers, and store the de-convolved signals.

In one or more aspects of the disclosed system, the de-convolution operation is based on a subtraction model using a difference in strain between ends of the gauge lengths of the one or more interferometers.

In one or more aspects of the disclosed system, the de-convolution operation is based on a summation model using a sum of strain between ends of the gauge lengths of the one or more interferometers.

In one or more aspects of the disclosed system, applying a de-convolution operation to the signals includes applying an inverse Z-transform. In one or more aspects of the disclosed system, the inverse Z-transform includes a truncated infinite series. In one or more aspects of the disclosed system, the information handling system is further configured to apply a weighting function to the truncated infinite series. In one or more aspects of the disclosed system, the weighting function is linear. In one or more aspects of the disclosed system, the weighting function is exponential.

In one or more aspects of the disclosed system, the de-convolution operation includes an inverse Fourier transform. In one or more aspects of the disclosed system, the inverse Fourier includes a truncated infinite series. In one or more aspects of the disclosed system, the information handling system is further configured to apply a weighting function to the truncated infinite series. In one or more aspects of the disclosed system, the weighting function is linear. In one or more aspects of the disclosed system, the weighting function is exponential.

In one or more aspects of the disclosed system, the information handling system is further configured to apply weights to the signals from the photo detector assembly prior to applying the de-convolution operation to the signals.

In one or more aspects of the disclosed system, applying the de-convolution operation to the signals based on the gauge lengths of the one or more interferometers comprises applying a first de-convolution operation based on a first gauge length of a first interferometer of the one or more interferometers, and applying a second de-convolution operation based on a second gauge length of a second interferometer of the one or more interferometers.

In another embodiment, a method comprises receiving signals from a photodetector assembly coupled to a distributed acoustic sensing (DAS) system, applying a de-convolution operation to the signals based on gauge lengths of one or more interferometers of the DAS system, and storing the de-convolved signals.

In one or more aspects of the disclosed method, the de-convolution operation is based on a subtraction model using a difference in strain between ends of the gauge lengths of the one or more interferometers.

In one or more aspects of the disclosed method, the de-convolution operation is based on a summation model using a sum of strain between ends of the gauge lengths of the one or more interferometers.

In one or more aspects of the disclosed method, applying a de-convolution operation to the signals includes applying an inverse Z-transform. In one or more aspects of the disclosed method, the inverse Z-transform includes a truncated infinite series. In one or more aspects of the disclosed method, the method further comprises applying a weighting function to the truncated infinite series. In one or more aspects of the disclosed method, the weighting function is linear. In one or more aspects of the disclosed method, the weighting function is exponential.

In one or more aspects of the disclosed method, the de-convolution operation includes an inverse Fourier transform. In one or more aspects of the disclosed method, the inverse Fourier includes a truncated infinite series. In one or more aspects of the disclosed method, the method further comprises applying a weighting function to the truncated infinite series. In one or more aspects of the disclosed method, the weighting function is linear. In one or more aspects of the disclosed method, the weighting function is exponential.

In one or more aspects of the disclosed method, the method further comprises applying weights to the signals from the photo detector assembly prior to applying the de-convolution operation to the signals.

In one or more aspects of the disclosed method, applying the de-convolution operation to the signals based on the gauge lengths of the one or more interferometers comprises applying a first de-convolution operation based on a first gauge length of a first interferometer of the DAS system, and applying a second de-convolution operation based on a second gauge length of a second interferometer of the DAS system.

In another embodiment, a computer-readable medium comprising instructions that, when executed by a processor, cause a processor to receive signals from a photodetector assembly coupled to a distributed acoustic sensing (DAS) system, apply a de-convolution operation to the signals based on gauge lengths of one or more interferometers of the DAS system, and store the de-convolved signals.

In one or more aspects of the disclosed computer-readable medium, the de-convolution operation is based on a subtraction model using a difference in strain between ends of the gauge lengths of the one or more interferometers.

In one or more aspects of the disclosed computer-readable medium, the de-convolution operation is based on a summation model using a sum of strain between ends of the gauge lengths of the one or more interferometers.

In one or more aspects of the disclosed computer-readable medium, applying a de-convolution operation to the signals includes applying an inverse Z-transform. In one or more aspects of the disclosed computer-readable medium, the inverse Z-transform includes a truncated infinite series. In one or more aspects of the disclosed computer-readable medium, the medium further comprising instructions that, when executed, cause the processor to apply a weighting function to the truncated infinite series. In one or more aspects of the disclosed computer-readable medium, the weighting function is linear. In one or more aspects of the disclosed computer-readable medium, the weighting function is exponential.

In one or more aspects of the disclosed computer-readable medium, the de-convolution operation includes an inverse Fourier transform. In one or more aspects of the disclosed computer-readable medium, the inverse Fourier includes a truncated infinite series. In one or more aspects of the disclosed computer-readable medium, the medium further comprising instructions that, when executed, cause the processor to apply a weighting function to the truncated infinite series. In one or more aspects of the disclosed computer-readable medium, the weighting function is linear. In one or more aspects of the disclosed computer-readable medium, the weighting function is exponential.

In one or more aspects of the disclosed computer-readable medium, the medium further comprising instructions that, when executed, cause the processor to apply weights to the signals from the photo detector assembly prior to applying the de-convolution operation to the signals.

In one or more aspects of the disclosed computer-readable medium, the instructions that cause the processor to apply the de-convolution operation to the signals based on the gauge lengths of the one or more interferometers further comprise instruction that cause the processor to apply a first de-convolution operation based on a first gauge length of a first interferometer of the DAS system, and apply a second de-convolution operation based on a second gauge length of a second interferometer of the DAS system.

Illustrative embodiments of the present disclosure have been described in detail herein. In the interest of clarity, not all features of an actual implementation may be described in this specification. It will of course be appreciated that in the development of any actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drill string or the hole from the distal end towards the surface, and "downhole" as used herein means along the drill string or the hole from the surface towards the distal end.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU") or hardware or software control logic, ROM, and/or other types of nonvolatile memory. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires.

The present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A system, comprising:
   a light source;
   optical fiber coupled to the light source;
   one or more interferometers coupled to the optical fiber, each interferometer of the one or more interferometers comprising a gauge length;
   a photodetector assembly coupled to the optical fiber and configured to detect backscattered light from the optical fiber and generate signals based on the detected backscattered light; and
   an information handling system configured to:
      receive the signals from the photodetector assembly;
      apply a de-convolution operation to the signals based on the gauge lengths of the one or more interferometers; and
      store the de-convolved signals.

2. The system of claim 1, wherein the de-convolution operation is based on a subtraction model using a difference in strain between ends of the gauge lengths of the one or more interferometers.

3. The system of claim 1, wherein the de-convolution operation is based on a summation model using a sum of strain between ends of the gauge lengths of the one or more interferometers.

4. The system of claim 1, wherein applying a de-convolution operation to the signals includes applying an inverse transform comprising a truncated infinite series, the inverse transform being an inverse Z-transform or an inverse Fourier transform.

5. The system of claim 4, wherein the information handling system is further configured to apply a weighting function to the truncated infinite series.

6. The system of claim 5, wherein the weighting function is linear or exponential.

7. The system of claim 1, wherein the information handling system is further configured to apply weights to the signals from the photo detector assembly prior to applying the de-convolution operation to the signals.

8. The system of claim 1, wherein applying the de-convolution operation to the signals based on the gauge lengths of the one or more interferometers comprises:
applying a first de-convolution operation based on a first gauge length of a first interferometer of the one or more interferometers; and
applying a second de-convolution operation based on a second gauge length of a second interferometer of the one or more interferometers.

9. A method, comprising:
receiving signals from a photodetector assembly coupled to a distributed acoustic sensing (DAS) system;
applying a de-convolution operation to the signals based on gauge lengths of one or more interferometers of the DAS system; and
storing the de-convolved signals.

10. The method of claim 9, wherein the de-convolution operation is based on a subtraction model using a difference in strain between ends of the gauge lengths of the one or more interferometers.

11. The method of claim 9, wherein the de-convolution operation is based on a summation model using a sum of strain between ends of the gauge lengths of the one or more interferometers.

12. The method of claim 9, wherein applying a de-convolution operation to the signals includes applying an inverse transform comprising a truncated infinite series, the inverse transform being an inverse Z-transform or an inverse Fourier transform.

13. The method of claim 12, further comprising applying a weighting function to the truncated infinite series.

14. The method of claim 13, wherein the weighting function is linear or exponential.

15. The method of claim 9, further comprising applying weights to the signals from the photo detector assembly prior to applying the de-convolution operation to the signals.

16. The method of claim 9, wherein applying the de-convolution operation to the signals based on the gauge lengths of the one or more interferometers comprises:
applying a first de-convolution operation based on a first gauge length of a first interferometer of the DAS system; and
applying a second de-convolution operation based on a second gauge length of a second interferometer of the DAS system.

17. A computer-readable non-transitory medium comprising instructions that, when executed by a processor, cause a processor to:
receive signals from a photodetector assembly coupled to a distributed acoustic sensing (DAS) system;
apply a de-convolution operation to the signals based on gauge lengths of one or more interferometers of the DAS system; and
store the de-convolved signals.

18. The computer-readable medium of claim 17, wherein the de-convolution operation is based on a subtraction model using a difference in strain between ends of the gauge lengths of the one or more interferometers.

19. The computer-readable medium of claim 17, wherein the de-convolution operation is based on a summation model using a sum of strain between ends of the gauge lengths of the one or more interferometers.

20. The computer-readable medium of claim 17, wherein applying a de-convolution operation to the signals includes applying an inverse transform comprising a truncated infinite series, the inverse transform being an inverse Z-transform or an inverse Fourier transform.

21. The computer-readable medium of claim 20, further comprising instructions that, when executed, cause the processor to apply a weighting function to the truncated infinite series.

22. The computer-readable medium of claim 21, wherein the weighting function is linear or exponential.

23. The computer-readable medium of claim 17, further comprising instructions that, when executed, cause the processor to apply weights to the signals from the photo detector assembly prior to applying the de-convolution operation to the signals.

24. The computer-readable medium of claim 17, wherein the instructions that cause the processor to apply the de-convolution operation to the signals based on the gauge lengths of the one or more interferometers further comprise instruction that cause the processor to:
apply a first de-convolution operation based on a first gauge length of a first interferometer of the DAS system; and
apply a second de-convolution operation based on a second gauge length of a second interferometer of the DAS system.

* * * * *